Inventor
A. H. Jackson

Patented June 21, 1927.

1,633,102

UNITED STATES PATENT OFFICE.

ALBERT HENRY JACKSON, OF LONDON, ENGLAND.

ELECTRIC MOTOR CONTROL SYSTEM.

Application filed March 5, 1926, Serial No. 92,592, and in Great Britain August 18, 1925.

This invention relates to improvements in or relating to electric motor control systems of the type in which a pilot-motor-driven switch mechanism for varying the conditions in the circuit of the main motors is remotely controlled from a master controller actuated by the operator.

Such systems are in common use for the control of electric trains, locomotives and the like, and this invention is particularly applicable to that form of motor control known in practice as the "cam-shaft" type, in which the remote actuated switch mechanism for the main motors takes the form of a series of cams mounted upon a common shaft and adapted to actuate mechanically contactor switches which perform the various changes in the circuit of the main motors, such, for example, as the cutting in or out of resistance, grouping of the motors in series or in parallel, and so forth.

Such systems of control are required to accelerate the motors, either step by step according to the movement of the master controller handle by the operator, or, automatically, under the control of an apparatus known in practice as a current limit relay.

In the former case they are known as "non-automatic acceleration" or "manual acceleration" systems, and in the latter case as "automatic acceleration" systems.

Frequently a combination of both systems is required, so that from the master controller acceleration of the motors may be effected either non-automatically or automatically at the will of the operator. By reason, however, of the fact that such systems of control are fundamentally best suited for "automatic acceleration" under the control of a current limit relay, and have hitherto become very complicated when it has been necessary to provide also for "non-automatic acceleration," it is highly desirable, and it is the object of this invention, to provide means of adapting such systems for "non-automatic acceleration" in addition to "automatic acceleration," in a manner which shall be free from complexity and which shall involve the minimum addition of apparatus to the equipment required.

In the invention this object can be achieved with the addition of only two additional train lines and one additional relay, no matter how many steps are desired in the "non-automatic-acceleration" control, whereas heretofore, where a large number of control steps is required, as in locomotive haulage, the additional relays and train lines necessary were so many and the complication of connections so great as to cause the system to become extremely complex and thus to militate seriously against its reliability, while adding appreciably to its first cost and to the cost of maintenance.

One feature of the invention, therefore, consists in the provision of an additional relay, operable from the master controller, for the purpose of rendering ineffective the operation of the maximum current relay.

According to another feature two additional train lines are provided co-operating alternately with additional contacts in the master controller and on the switch mechanism for the purpose of securing step-by-step motion of the switch mechanism in accordance with the operation of the master controller.

The invention is illustrated in the accompanying drawings, in which:—

Figure 1:
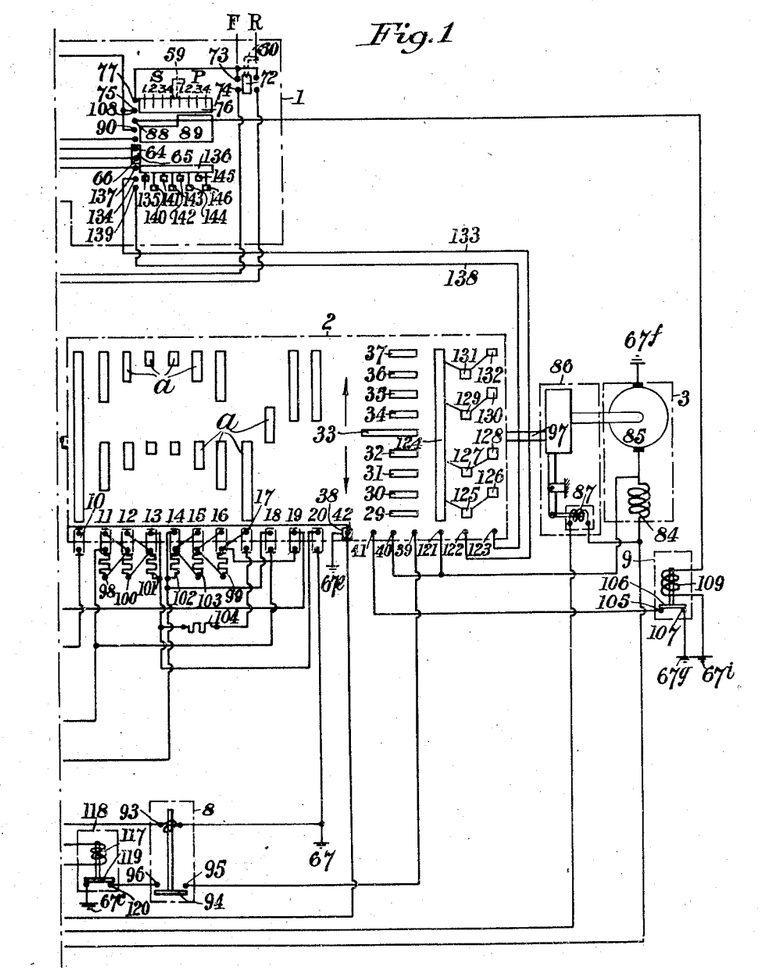
Fig. 1 shows diagrammatically a typical automatic acceleration system of a motor controlled with the improvements of the present invention incorporated to render such system additionally capable of non-automatic acceleration operation.

The system illustrated is of the cam-shaft type in which is incorporated electro-mechanically operated friction reversing gear 86 interposed between the uni-directional pilot motor 3 and the cam shaft 97, said reversing gear being the subject of my United States Patent No. 1,560,382. The switch mechanism 4 for reversing the direction of drive of the main motors 5 and 6 is of the cam-shaft-mounted, cam-operated type which is the subject of a concurrent application for United States Patent filed March 5, 1926, Serial No. 92,591.

1 is a master controller, 2 is a main controller of the cam-shaft type driven by pilot motor 3. The movement of the main controller is limited in the initial and maximum positions by mechanical stops not shown.

4 is a cam-shaft-mounted, cam-operated reverser, hereinafter referred to as the motor reverser, for reversing the main motors 5 and 6, 7 is an electro-magnetically operated line switch, 8 is a maximum current relay, and 9 is a paralleling relay.

$a, a, a, a$ represent diagrammatically the actuating cams of the main controller, which cams serve to close the mechanical contactors 10, 11, 12, 13, 14, 15, 16, 17, 18, 19 and 20.

$b, b, b, b$ represent diagrammatically the actuating cams of the motor reverser, which cams serve to close the mechanical contactors 21, 23, 25, 27 or 22, 24, 26, 28 according to the longitudinal position of the motor reverser 4.

Moving contact pieces 29 to 38 move with the main controller 2 and are adapted to engage with stationary contacts 39, 40, 41 and 42. The energization of coil 43 or coil 44 disposes the motor reverser 4 into the appropriate position for forward or reverse drive of the main motors 5 and 6 according to the position of the reverse handle 60 of the master controller.

Moving contact pieces 45 and 46 move into one or other of the positions X or Y in accordance with the movement of the motor reverser 4, and are adapted to engage with stationary contacts 80, 78, 79, 79' or 78, 79, 79', 78'.

47 is the main actuating coil of the line switch 7. 48 and 49 are electromagnet coils controlling the toggle members 50 and 51 of the line switch 7. The arrangement of said line switch is such that the contacts 52 and 53 leading to the main motors 5 and 6 are not closed, even though coil 47 be energized, unless toggle members 50 and 51 are set by the "set" coil 49. Should the toggle members be unset, either by the operation of overload coil 54 and link 55 or by the energization of trip coil 48 and link 56, then the circuit of the main motors is opened between contacts 52 and 53, even though the plunger 57 of the line switch is raised by the energization of coil 47.

58 is a two-way switch for energizing either "set" coil 49 or "trip" coil 48, for the purpose of setting or unsetting the toggle members of the line switch.

The operation of the system as an automatic acceleration system is as follows:—

The main and reverse handles 59 and 60 of the master controller 1 being in the "off" position as shewn, two-way switch 58 is actuated to connect moving contact arm 61 to stationary contact 62. A circuit is thus established from the source of supply at 63 through moving contact arm 61, stationary contact 62, stationary contact 64, moving contact piece 65 and stationary contact 66 of the master controller and the set coil 49 to the negative pole of supply, in this case the earth, $67^d$. Set coil 49 is thus energized and actuates link 68 to set the toggle members 50 and 51 and to bring moving contact piece 69 into connection with stationary contacts 70 and 71.

The reversing handle 60 of the master controller 1 being thrown now, for example, into forward position F, movable contact 72 of the master controller engages with fixed contacts 73 and 74, but no circuit is established until the main handle 59 of the master controller 1 is moved. Assuming this to be moved into series position S a circuit is established from the source of supply at 63 through contacts 75, 76, 77, 73, 72 and 74 of the master controller to motor reverser coil 43. Should the motor reverser 4 be found set in position Y for reverse operation of the motors the moving contact piece 45 couples stationary contact 78 to stationary contact 79 and a circuit is completed through fixed contact 42 and moving contact 38 of the main controller 2 to the earth $67^e$. Coil 43 is accordingly energized and moves the motor reverser 4 into the appropriate position X for forward drive of the main motors. This connects stationary contact 78 to stationary contact 80 via the moving contact piece 45, breaking the previous circuit to earth but establishing a new circuit to earth at $67^f$ via stationary contacts 81 and 82 and moving contact piece 83 of the line switch 7 and the field winding 84 and armature 85 of the pilot motor 3. The pilot motor is accordingly energized, but the reversing gear 86 between it and the main controller 2 is held in reverse position because of coil 87 being short-circuited by stationary contacts 81 and 82 and moving contact piece 83 of the line switch 7. The pilot motor therefore at this moment retains the main controller in the "off" position against a mechanical stop not shewn.

The movement of the main handle 59 of the master controller 1 into position S, however, establishes also a circuit from the source of supply at 63 through contacts 88, 89, and 90 of the master contoller and 70, 69, and 71 of the interlock switch operatively connected to the line switch toggle members, the current passing through coil 47, stationary contact 42 and moving contact piece 38 of the main controller to earth $67^e$. This energizes coil 47 and the line switch plunger 57 is actuated, closing the circuit to the main motors 5 and 6 through the agency of contacts 52 and 53. At the same time moving contact piece 83 is brought into connection with stationary contacts 91 and 92 so as to establish an alternative circuit to earth at $67^h$ for the coil 47. The movement of contact piece 83 removes the short-circuit from coil 87 and the reversing gear 86 is now thrown for forward drive of the main controller by the consequent energization of coil 87. The main controller, therefore, commences to move in a forward direction closing contactors 10 and 17 to start the main motors 5 and 6 in series connection.

The current now flowing through the main motors passes through coil 93 of the maximum current relay 8 and should the current reach a pre-determined limit of strength this relay is actuated and the moving contact piece 94 connects contacts 95 and 96 so that when the main controller has reached a position such that moving contact 29 is in connection with stationary contacts 39 and 40 a short-circuit is created across armature 85 of the pilot motor 3, thus bringing the cam shaft 97 immediately to rest.

Upon the current in coil 93 decreasing the moving contact piece 94 drops and the main controller is allowed to resume forward progression, thus closing contactors 11 and 16 and cutting out resistance sections 98 and 99 from the main motor circuit. This again increases the current in coil 93 and the previously described procedure is repeated, the main controller being moved step-by-step until it reaches a position such that moving contact piece 33 bridges stationary contacts 39, 40 and 41. By this time contactors 12, 13, 14, 15 and 18 have also been closed by their respective cams and the remaining sections 100, 101, 102, 103, and 104 of resistance cut out of the circuit of the main motors.

The main motors now have full potential imposed upon them and are coupled in series connection. At this stage a short-circuit is established across the armature 85 of the pilot motor 3 from earth $67^r$ via stationary contact 40, moving contact 33, stationary contact 41, fixed contacts 105 and 107 and moving contact 106 of the paralleling relay 9 to earth at $67^s$. This immediately arrests the cam shaft 97 and brings the main controller 2 to rest.

On now moving the main handle 59 of the master controller 1 into position P a further circuit is established from the source of supply at 63, through contacts 88, 89 and 90 of the master controller and energizing coil 109 of the paralleling relay 9 to earth at $67^t$. Coil 109 is thus energized and lifts the moving contact piece 106 of the paralleling relay, thus opening the short-circuit across the pilot motor armature 85. Accordingly the main controller resumes its forward progression, closing contactors 19 and 20 which couple the main motors in parallel connection. Thereafter, forward progression of the main controller continues step by step under the control of maximum current relay 8, stationary contacts 39 and 40 and moving contact pieces 34, 35, 36 and 37 of the main controller in manner similar to that already described with reference to the series position.

If at any time the current passing through the main motors reaches an excessive amount, coil 54, through links 55 and 56, operates to unset the toggle members 50 and 51 of the line switch 7. When this occurs moving contact piece 69 interrupts the circuit of energizing coil 47 of the line switch and the line switch opens, breaking the connection between contacts 52 and 53 and interrupting the circuit of the main motors. At the same time the moving contact piece 83 drops and short-circuits, through the agency of stationary contacts 81 and 82, coil 87, thus throwing the reversing gear into reverse position and causing the pilot motor to return the main controller 2 to its initial or "off" position.

A like result may be produced at any time by the actuation of two-way switch 58 into position such that moving contact arm 61 engages with stationary contact 110. In such event a circuit is established from the source of supply at 63 through moving contact arm 61, stationary contact 110 and trip coil 48 to earth at $67^j$, thus energizing trip coil 48 and, by the agency of link 56, unsetting the toggle members 50 and 51 of the line switch.

The foregoing operations are similar to those in a typical "automatic acceleration" motor control system. Heretofore in order to adapt such a system for "non-automatic acceleration" it has been necessary to introduce a plurality of electro-magnetically operated relays, considerable extra complications in the master controller and in the auxiliary contacts of the main controller and also a considerable number of additional connecting lines running between the master controller and the control apparatus. These lines are known in practice as "train lines" and as they have to run throughout the whole length of the train, connecting from car to car by means of multi-point couplers, it is highly desirable to limit their number to an absolute minimum.

According to my invention adaptation for "non-automatic acceleration" in addition to "automatic acceleration" is accomplished in a manner at once simple and requiring only two additional train lines and one additional relay.

On reference to the drawing it will be seen that for the purpose of the invention an additional switch with handle 111 and additional contact parts are incorporated in the master controller, also additional contact parts in the main controller, while there is provided further one additional electromagnetically operated relay 118 and two additional train lines 133 and 138.

In operating the control system for "automatic acceleration" the handle 111 of the additional switch in the master controller is left in position A so that no contact is made by contacts 112 and 113. If, however, "non-automatic" acceleration is desired, the handle 111 is actuated into position M to throw contacts 112 and 113 respectively into connection with fixed contacts 114 and 115 and 116 and earth at 67ª. This establishes a circuit from the source of supply at 63 through contacts 114, 112 and 115 and coil 117 of relay 118 to earth at 67ᵇ, thus actuating said relay 118 and causing its armature 119 to "open circuit" the contacts 120 and 67ᶜ, thus interrupting the auxiliary circuit controlled by maximum current relay 8. Maximum current relay 8, therefore, although still operating with the changes in strength of current in the main motor circuit, hence forth occasions no short-circuit across the armature 85 of the pilot motor and hence ceases to function to bring the cam shaft to rest.

The line switch toggle mechanism having been set as before described and reversing handle and main handle 60 and 59 of the master controller 1 being thrown into positions F and S respectively, the procedure as previously described with reference to "automatic-acceleration" takes place until the main controller has moved forward one step corresponding to the closure of contactors 10 and 17. At this point, whereas previously maximum current relay 8 was capable of arresting the cam shaft through the agency of the short-circuit occasioned across the armature 85 of pilot motor 3 by contacts 39, 29 and 40 on the main controller, now this short-circuit can no longer be created because of the interruption of the auxiliary circuit controlled by the maximum current relay 8 by relay 118. There are, however, provided on the main controller additional fixed contacts 121, 122 and 123 adapted to co-operate with moving contacts 124 to 132, and at this stage a fresh short circuit is established for armature 85 of pilot motor 3 which extends from earth 67ᶠ via positive side of the pilot motor armature 85, fixed contact 121, moving contacts 124 and 125 and fixed contact 122 of the main controller, additional train line 133, fixed contact 134, moving contacts 135 and 136, fixed contacts 137 and 116, moving contact 113 and fixed contact 67ᵃ of the master controller to earth. This short-circuit accordingly arrests the pilot motor and the main controller is stopped in this position until further movement of the master controller main handle 59 is made.

On moving handle 59 into position S.², the short-circuit is broken by the parting of contacts 134 and 135 in the master controller. The pilot motor, therefore, recommences to drive the main controller forwardly until the next step is reached, in which moving contacts 124 and 126 of the main controller re-establish a short-circuit across the pilot motor armature via fixed contact 123, additional train line 138, fixed contact 139 and moving contact 140 of the master controller. The pilot motor thus again arrests the cam shaft until further movement of the master controller main handle is made. In similar manner contacts 127 to 132 of the main controller and 141 to 146 of the master controller co-operate to arrest the main controller in the several positions corresponding to consecutive positions of the master controller main handle. It will thus be seen that the movement of the main controller is made to correspond step by step with that of the master controller main handle so that complete "non-automatic-acceleration" control of the main motors is secured.

It will be apparent, however, that for the system to function correctly the responding speed of movement of the main controller must be at least as great as the maximum speed in which it is possible for the operator to move the master controller handle from step to step. Preferably I can achieve this by slowing the speed of movement of the master controller handle rather than by excessively speeding up the switch mechanism, which would have obvious practical objections, and accordingly I prefer to provide in the master controller a mechanical "time element" device of known type such as a dash pot so as to ensure a compulsory minimum time interval between consecutive movemens from notch to notch, this minimum time interval being appreciably greater than is required for the pilot motor to drive the main controller correspondingly from step to step.

The mechanical time element device preferably comes into operation only when switch handle 111 on the master controller is thrown into position M for "non-automatic acceleration" and does not function during "automatic acceleration" when handle 111 is in position A.

Figure 2:
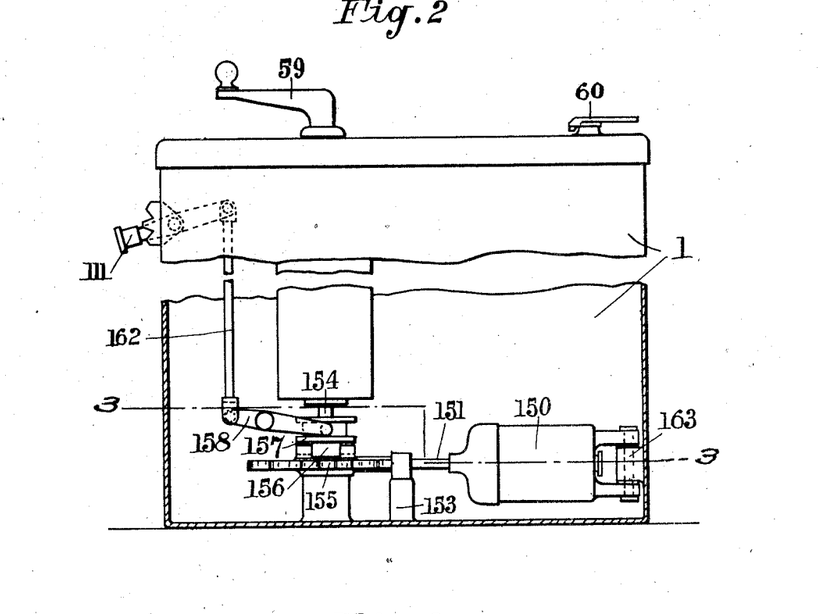
Fig. 2 is an elevation of the master controller with part of the casing removed to illustrate the interior, showing only such parts as are necessary to illustrate the operation of the dash-pot time element device.
Figure 3:
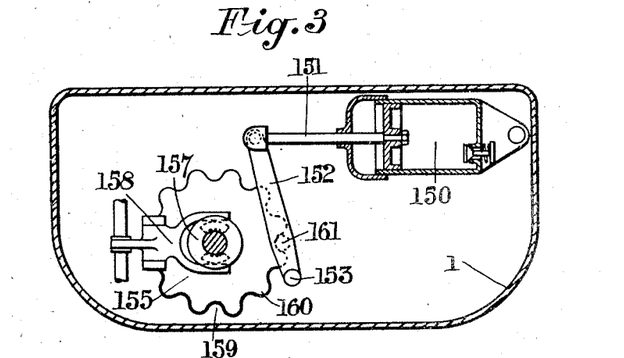
Fig. 3 is a sectional view substantially on the line 3—3 of Fig. 2.

The dash-pot 150 is pivotally mounted on a bracket 163 on the side of the casing of the controller 1, the free end of its plunger shaft 151 being pivoted to one end of a lever 152 the other end of which is mounted on a pivot pin 153 projecting from the floor of the casing. The drum carrying shaft 154 which is rotated by the main handle 59 carries freely on its lower end a disk 155 to the upper surface of which is fixed one dog 156 of a common form of dog clutch. This disk 155 is provided on its periphery with semi-circular indentations 159 corresponding to the notches of the controller and with semi-circular projections 160 over which a pin 161 on the lever 152 rides. The movable dog 157 of the clutch is mounted on a splined or squared portion of the shaft 154, and through the medium of a rod 162 and pivoted striking fork 158 is caused to engage with the other dog 156 when the handle 111 is in its lower or manual position and to disengage from the dog 156 when the handle is moved to its upper or automatic position. The handle 111 also operates in the usual manner a contact drum (not shown) which causes the contacts 112, 113, (see Fig. 1) to cooperate or not with the fixed contacts 114, 115, and 116, 67ª. It will be evident that when the handle 111 is in its upper or automatic position the disk 155 is declutched from the drum shaft 154 and the dash-pot 150 is therefore ineffective. When, however, the handle 111 is in its lower or manual position the disk 155 is clutched to the shaft 154 so that during the movement of the handle 111 from one notch to the next, the pin 161 is constrained to ride over a projection 160 on the disk 155 against the compression of the dash-pot, thereby ensuring that the necessary minimum time interval is introduced between notches.

What I claim is:

1. In combination with a system of electric motor control in which a pilot-motor-driven switch mechanism is remote operated from a master controller and "automatic acceleration" of the main motors is obtained by the employment of a maximum current relay, an additional relay and controlling means for said additional relay, said controlling means including two additional train lines and contacts therefor and being operable by said master controller, the arrangement being such that when said additional relay is brought into operation the maximum current relay is rendered inoperative.

2. In combination with a system of electric motor control adapted for both automatic and non-automatic acceleration of the main motors, a relay, stationary contacts, movable contacts for co-operation with the stationary contacts, two train lines connected to the stationary contacts, manual means for actuating some of the movable contacts, a main controller carrying the other movable contacts, means for rotating said main controller, a maximum current relay, said maximum current relay effecting "automatic acceleration" of the main motors, and an additional relay with means connecting it to the stationary and movable contacts, the arrangement being such that when the movable contacts co-operate with the stationary contacts the additional relay will render the maximum current relay ineffective and permit of step by step movement of the main controller.

3. In combination with a system of electric motor control adapted for both automatic and non-automatic acceleration of the main motors and including a master controller and switch mechanism, contacts on the switch mechanism and in the master controller, and two additional train lines co-operating alternately with the said additional contacts, the arrangement being such that a step by step movement of the switch mechanism is obtained in accordance with the operation of the master controller.

4. In combination with a system of electric motor control adapted for both automatic and non-automatic acceleration of the main motors and including a master controller and a remote controlled switch mechanism, an auxiliary motor circuit including a pilot motor for driving said switch mechanism, a maximum current relay adapted to short circuit said pilot motor periodically in order to produce a step by step motion of the switch mechanism, an additional relay adapted to render said maximum current relay ineffective, and means on the master controller for bringing said relay into operation whereby the operation of the said maximum current relay is rendered ineffective.

5. In combination with a system of electric motor control adapted for both automatic and non-automatic acceleration of the main motors and including a master controller and a remote controlled switch mechanism, an auxiliary motor circuit including a pilot motor for driving said switch mechanism, a maximum current relay adapted to short circuit said pilot motor periodically in order to produce a step by step motion of the switch mechanism, an additional relay, additional movable contacts on the master controller, additional stationary contacts on the main controller, said stationary contacts co-operating with the said movable contacts, additional movable contacts on the switch mechanism, additional stationary contacts on the switch mechanism adapted to co-operate with the last mentioned movable contacts, two train lines connecting the stationary contacts of the master controller to the stationary contacts of the switch mechanism, and a conductor to one pole of the supply system, said conductor including said additional relay and being connected to one of the stationary contacts on the switch mechanism.

6. In combination with a system of electric motor control adapted for both automatic and non-automatic acceleration of the main motors and including a master controller and a remote controlled switch mechanism, an auxiliary motor circuit including a pilot motor for driving said switch mechanism, a maximum current relay adapted to short circuit said pilot motor periodically in order to produce a step by step motion of the switch mechanism, an additional relay, four additional stationary contacts on the master controller, two additional movable contacts on the master controller, said movable contacts being adapted to co-operate with the stationary contacts, operating means for said movable contacts whereby said contacts may be moved into a position to co-operate with the stationary contacts and into an inoperative position, a plurality of additional stationary contacts on the switch mechanism, two train lines connecting two of the additional contacts on the master controller to two of the additional contacts on the switch mechanism, a plurality of additional movable contacts on the switch mechanism adapted to co-operate with the stationary contacts thereon, a line from one pole of the supply connected to one of the stationary contacts on the switch mechanism, said line including the armature of the maximum current relay and the armature of the additional relay, a second line from the same pole of the supply connected to one of the stationary contacts of the main controller, said second line including the coil of the additional relay, and a line connecting another of the stationary contacts of the master controller to the other pole of current supply of the system.

7. In combination with a system of electric motor control adapted for both automatic and non-automatic acceleration of the main motors and including a master controller and a remote controlled switch mechanism, an auxiliary motor circuit including a pilot motor for driving said switch mechanism, a maximum current relay adapted to short circuit said pilot motor periodically in order to produce a step by step motion of the switch mechanism, an additional relay, means on the master controller for bringing said additional relay into operation whereby the operation of the maximum current relay is rendered ineffective, and a time element device in connection with the master controller to ensure that for non-automatic acceleration the master controller may not be operated faster than the inherent responding speed of the switch mechanism.

8. In combination in a system of electric motor control adapted for both "automatic" and "non-automatic" acceleration of the main motors, a master controller, a plurality of stationary contacts on said master controller, a plurality of movable contacts on said master controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, main motors connected between the motor reverser and the main controller, an electromagnetically operated line switch, a maximum current relay, a paralleling relay, and an additional relay adapted to render the maximum current relay ineffective when the system is to be controlled for "manual" acceleration of the main motors.

9. In combination in a system of electric motor control adapted for both "automatic" and "non-automatic" acceleration of the main motors, a master controller, a plurality of stationary contacts on said master controller, a plurality of movable contacts on said master controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, electro-magnetic means adapted to actuate the motor reverser, main motors connected between the motor reverser and the main controller, an electromagnetically operated line switch, a maximum current relay, a paralleling relay, and an additional relay adapted to render the maximum current relay ineffective when the system is to be controlled for "manual" acceleration of the main motors.

10. In combination in a system of electric motor control, a master controller, a plurality of stationary contacts on said master controller, a plurality of movable contacts on said motor controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, main motors connected between the motor reverser and the main controller, an electromagnetically operated line switch, a maximum current relay, a paralleling relay, a two way switch adapted in one position to connect up the system for "automatic" acceleration and in a second position for "non-automatic" acceleration, and an additional relay adapted to render the maximum current relay ineffective when the system is to be controlled for "non-automatic" acceleration of the main motors.

11. In combination in an electric motor control system, a master controller, a plurality of stationary contacts on said master controller, a plurality of movable contacts on said master controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, main motors connected between the motor reverser and the main controller, an electromagnetically operated line switch, a maximum current relay, a paralleling relay, a time element device in connection with the master controller to ensure that for "non-automatic" acceleration the master controller may not be operated faster than the inherent responding speed of the main controller, and an additional relay adapted to render the maximum current relay ineffective when the system is to be controlled for "non-automatic" acceleration of the main motors.

12. In combination in a system of electric motor control, a master controller, a plurality of stationary contacts on said master controller, a plurality of movable contacts on said master controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, main motors connected between the motor reverser and the main controller, an electromagnetically operated line switch, a maximum current relay, a paralleling relay, and an additional relay operable from the master controller for the purpose of rendering ineffective the operation of the maximum current relay when the system is used for "manual," acceleration of the main motors.

13. In combination in a system of electric motor control, a master controller, a plurality of stationary contacts on said master controller, a plurality of movable contacts on said master controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, main motors connected between the motors reverser and the main controller, an electromagnetically operated line switch, a maximum current relay, a paralleling relay, means for obtaining a step by step motion of the main controller in accordance with the operation of the master controller, and an additional relay adapted to render the maximum current relay ineffective when the system is to be controlled for "non-automatic" acceleration of the main motors.

14. In combination a master controller, a plurality of stationary contacts on said master controller, a plurality of movable contacts on said master controller for co-operation with the stationary contacts, additional stationary contacts on said master controller, additional movable contacts on the said master controller for co-operation with the additional stationary contacts, means for bringing the additional movable contacts into and out of a position for co-operation with the additional stationary contacts, a main controller having co-operating movable and stationary contacts, additional stationary and movable contacts on said main controller, two train lines connecting two of the additional stationary contacts on the master controller to two of the additional stationary contacts on the main controller, a pilot motor, said pilot motor being adapted to drive the main controller, a motor reverser, main motors connected between the motor reverser and the main controller, an electromagnetically operated line switch, a maximum current relay, a paralleling relay, an additional relay adapted to render the maximum current relay ineffective when the system is to be controlled for "non-automatic" acceleration of the main motors, and connecting lines between said elements, the whole arrangement being such that the system may be used both for "automatic" acceleration and for "non-automatic" acceleration of the main motors.

In testimony whereof I affix my signature.

ALBERT H. JACKSON.